UNITED STATES PATENT OFFICE.

OTTO K. ZWINGENBERGER, OF PERTH AMBOY, NEW JERSEY.

MEDICINAL COMPOSITION CONTAINING OIL.

1,235,179.  Specification of Letters Patent.  Patented July 31, 1917.

No Drawing.  Application filed November 22, 1911.  Serial No. 661,748.

*To all whom it may concern:*

Be it known that I, OTTO K. ZWINGEN-BERGER, a citizen of the United States, and a resident of Perth Amboy, in the county of Middlesex and State of New Jersey, have invented certain new and useful Improvements in Medicinal Compositions Containing Oil, of which the following is a full, clear, and exact description.

This invention refers more particularly to solidifying castor-oil, cod liver oil and similar edible oils for medicinal purposes and is an outgrowth of a former invention for which application for U. S. Patent Letters was filed April 22, 1909, Serial Number 491,543.

The primary object of the invention is to provide a process for deodorizing and rendering disinfectant, preserving and solidifying medicinal oils and the like which are of a very objectionable character, such for example as castor oil and cod liver oil, which are objectionable to take owing to the repugnant taste and smell, and at the same time solidifying such oils so that the same may be more conveniently handled and taken, and to provide a process which will add to these oils antiseptic and also disinfecting qualities which are especially needed in all the troubles of the stomach and intestinal tract, still retaining their excellent virtues and entirely removing their objectionable taste and smell.

Another object of the invention is to provide an article of manufacture containing a considerable amount of castor oil, cod liver oil or other medical oils.

A further object of the invention is to combine the oil with the material or materials in the form of tablets or in other convenient forms.

With these and other objects in view, the invention will be hereinafter more particularly described, and pointed out in the claims at the end of the description.

It has been well known that it would be very desirable, if for instance castor oil as well as cod liver oil or the like oils could be relieved of its bad taste and at the same time rendered disinfectant, that such a process as well as the article would possess great advantage over the usual means employed to simply disguise the bad taste and odor of the oils.

I have discovered that peat fills more completely the many conditions required to secure the desirable results mentioned than any other material. Peat contains certain organic matters of highly disinfecting properties, which stop especially fermentation and decomposition of organic substances occurring during disturbances of the digestive organs, furthermore they render cod liver oil, castor oil and other oils stable and prevent them from becoming rancid. Peat to a considerable part is easily digested and has also a considerable food value. I found that peat readily removes all disagreeable and nauseating taste, and affords a way to administer such oils in an agreeable and palatable form, retaining all their active properties and medical virtues. Peat contains also certain other organic matters which exert a certain effect on the components which confer that repugnant taste to many of the edible oils. These organic matters consist mostly of organic acids and certain colloidal matters the latter of which are of the greatest importance in their relation between peat and castor oil for instance, as these colloidal matters prevent wet peat from being dried except with great difficulty, and peat once dried does not take up water again because those colloidal matters make it impermeable to water. Owing to the colloidal matters I have found that peat heavily saturated with either castor oil or cod liver oil or any other edible oil may be easily soaked with water like a sponge. In my application Serial No. 491,543 now U. S. Patent No. 1,012,788 I have described a process where edible oils of medical properties are mixed with peat and soluble chemical compounds. I have found on further investigations that this process is not readily applicable for combinations of peat and oils with chemical compounds which either are insoluble in water or in such liquids which may serve as a substitute of water in this process, or are decomposed by water or heat or by the simultaneous action of both of them, or may undergo other changes by the influence of heat, etc. Therefore a process different from that of U. S. Patent 1,012,788 as well as from that usually applied up to now in the pharmaceutical practice for embodying oils into tablets must be resorted to for bringing the composition into a convenient form for the trade.

By further investigation I have also found out that peat and medicinal oils affect in the most favorable manner the properties of many chemical preparations used in medicine.

As an elucidation of a composition made according to my process I choose the manufacturing of tablets carrying castor oil and phenolphthalein, which is insoluble in water. Phenolphthalein is a well known laxative which has many disagreeable and serious after effects on people of a delicate constitution. One has therefore endeavored to reduce these after-effects by combining phenolphthalein with certain organic acids to obtain the so-called "ether". By my process the desired results are obtained in a very convenient way and on account of certain properties of my composition I may greatly reduce the dose of the active principles.

The favorable result of the preparation, which allows such a great reduction in the quantity of the constituents in comparison to that usually administered at present, must be attributed to the ready disintegration the tablets are undergoing by the action of the juices of the stomach. Dried peat or a plain tablet made of dried peat is only after a very considerable lapse of time, and even then only partly, penetrated by water, whereas a tablet made after my process breaks up very easily in some few minutes when in touch with water. This disintegration causes the medical virtues of the components to come therefore readily and freely to action and this fact assures the great efficiency of my composition against the great dose necessary if each of the constituents is taken alone.

In preparing compositions carrying peat and medical oils besides admixtures of insoluble chemicals or such easily undergoing decomposition by the action of heat or water, etc., it was found preferable to omit water and also sugar or to at least reduce the amount of sugar to a great extent as it is no essential part in this process. For reason of the manipulations described below it is obvious that this new process is also applicable to chemicals soluble in water or in suitable substituents of same as such chemical compounds may be treated in exactly the like way.

Mixing the components, at least one of them being oil, was not always found to be a reliable way to furnish the desirable homogenous mixture and after many trials I preferred therefore to mix the dry materials, for instance 1 part of peat and 1/6–1/5 part of phenolphthalein, alone and to press regular tablets from them in any of the well-known ways. The finished tablets are then submerged for some time into a bath of castor oil and allowed to absorb the liquid to the amount of 1/6–1/5 of the weight of the applied peat. It is of course understood that the bath may also consist of a mixture of several oils. Any surplus of oil, which after a certain time may still adhere to the tablets, may be taken off by admixing fresh tablets of a smaller or larger diameter respectively to absorb the surplus; the admixed tablets may be separated by passing the mixture over a suitable sieve or by any of the well known ways of separation.

Oils being a well known softening material for hard substances it is a surprise to see that soaking the otherwise fully finished tablets of a mixture of peat with phenolphthalein or any other chemical compound does not lessen their durability, for they stay hard to fill all the requirements of trade for handling and storing.

I claim:

1. A new medicinal compound comprising peat, castor oil and phenol-phthalein.

2. A new medicinal compound comprising peat, castor oil and phenol-phthalein not exceeding the amount of castor oil.

3. A new medicinal compound comprising peat, castor oil and phenol-phthalein in equal quantities.

OTTO K. ZWINGENBERGER.

Witnesses:
PAULA BERG,
F. A. NAIMENBERG.